(12) United States Patent  
Srinath et al.

(10) Patent No.: US 12,493,525 B2  
(45) Date of Patent: Dec. 9, 2025

(54) RECOVERY OF DATA ASSOCIATED WITH A LOCKED SNAPSHOT VIA VOLUME CLONING FUNCTIONALITY

(71) Applicant: NetApp, Inc., San Jose, CA (US)

(72) Inventors: Vijay Srinath, Karnataka (IN); V Ramakrishna Rao Yadala, Karnataka (IN); Mohit Devarakonda, Hyderabad (IN); Shilpa Kumar, Karnataka (IN)

(73) Assignee: NetApp, Inc., San Jose, CA (US)

( * ) Notice: Subject to any disclaimer, the term of this patent is extended or adjusted under 35 U.S.C. 154(b) by 180 days.

(21) Appl. No.: 18/495,931

(22) Filed: Oct. 27, 2023

(65) Prior Publication Data

US 2025/0138946 A1   May 1, 2025

(51) Int. Cl.
| | |
|---|---|
| *G06F 12/00* | (2006.01) |
| *G06F 11/14* | (2006.01) |
| *G06F 16/176* | (2019.01) |
| *G06F 16/18* | (2019.01) |

(52) U.S. Cl.
CPC ...... *G06F 11/1448* (2013.01); *G06F 11/1469* (2013.01); *G06F 16/1774* (2019.01); *G06F 16/181* (2019.01)

(58) Field of Classification Search
CPC ............ G06F 11/1448; G06F 11/1469; G06F 11/1446; G06F 16/181; G06F 16/1774; G06F 12/14; G06F 12/16; G06F 3/065; G06F 3/0683

See application file for complete search history.

(56) References Cited

U.S. PATENT DOCUMENTS

| | | | |
|---|---|---|---|
| 7,480,778 B2 * | 1/2009 | Somavarapu | ........... G06F 3/067 711/147 |
| 7,587,563 B1 | 9/2009 | Teterin et al. | |
| 7,974,953 B1 | 7/2011 | Surla et al. | |
| 8,341,119 B1 | 12/2012 | Roussos et al. | |
| 8,370,589 B1 | 2/2013 | Surla et al. | |
| 8,954,718 B1 | 2/2015 | Raj et al. | |
| 9,715,347 B2 | 7/2017 | Ryu et al. | |
| 9,747,179 B2 | 8/2017 | Maheshwari et al. | |

(Continued)

OTHER PUBLICATIONS

Edwards J.K., et al., "Flexvol: Flexible, Effcient File Volume Virtualization in WAFL," Appears in Proceedings of the 2008 USENIX Annual Technical Conference. Boston, MA, Jun. 2008, pp. 129-142. Retrieved from URL: http://www.usenix.org/event/usenix08/tech/full.-papers/edwards-html/index.html.

(Continued)

*Primary Examiner* — Shawn X Gu  
(74) *Attorney, Agent, or Firm* — Jaffery Watson Hamilton & DeSanctis LLP

(57) ABSTRACT

Systems and methods are described for performing an instant recovery of data associated with a locked snapshot. In various examples, a recovery of data associated with a locked snapshot is performed by making use of volume cloning functionality instead of making an actual copy of the data to be recovered. In one embodiment, the resulting volume clone representing the recovery volume is cleared of all data protection information (e.g., WORM flags and/or lock metafiles) that was previously used to protect the content from being changed when stored on the data protection volume so as allow the recovery volume to be used in read-write mode.

20 Claims, 10 Drawing Sheets

(56) References Cited

U.S. PATENT DOCUMENTS

| | | | |
|---|---|---|---|
| 9,830,237 B2* | 11/2017 | Ramasubramaniam | .................... G06F 11/2082 |
| 10,228,964 B2 | 3/2019 | Caradonna et al. | |
| 10,489,073 B2 | 11/2019 | Kondapalli et al. | |
| 10,521,159 B2 | 12/2019 | Patel et al. | |
| 10,725,866 B1 | 7/2020 | Palaiah et al. | |
| 11,461,181 B2 | 10/2022 | Singh et al. | |
| 2006/0179261 A1* | 8/2006 | Rajan | ...................... G06F 16/10 711/170 |
| 2012/0278553 A1 | 11/2012 | Mudhiganti et al. | |

OTHER PUBLICATIONS

NetApp., "Create and Manage Point-in-time File System Copies with no Performance Impact and Minimal Storage Consumption," NetApp Snapshot Technology, 2011, 2 pages.

NetApp., "Data Protection and Disaster Recovery," OnTap 9, Oct. 9, 2023, pp. 1-435. Retrieved from URL: https://docs.netapp.com/us-en/ontap/concept_dp_overview.html.

Parisi J., "NetApp OnTap Flexgroup Volumes," Technical Report, NetApp, Jan. 2020, pp. 1-65.

Walter J., et al., "Compliant WORM Storage using NetApp SnapLock," OnTap 9, Technical Report, 2023, 30 pages.

* cited by examiner

RECOVERY OF DATA ASSOCIATED WITH A LOCKED SNAPSHOT VIA VOLUME CLONING FUNCTIONALITY

BACKGROUND

Field

Various embodiments of the present disclosure generally relate to storage systems, write once, read many (WORM) data storage, snapshots, and recovery of data associated with a locked snapshot. In particular, some embodiments relate to an approach for reducing the time associated with performing data recovery associated with a locked snapshot by using volume cloning functionality.

Description of the Related Art

A data protection volume of a data store system may operate as WORM storage, which may be used to retain critical files in unmodified form (e.g., as locked files or WORM-locked files) for regulatory and governance purposes. For disaster recovery and other purposes, snapshots may be taken of a data protection volume and replicated to another geographic location A snapshot is a read-only, point-in-time image of a volume that consumes minimal storage space and incurs negligible performance overhead. Various unique features of a Write Anywhere File Layout (WAFL) file system, which is available from NetApp, Inc. of San Jose, CA, makes possible low-overhead snapshots that contain metadata (e.g., pointers to data) instead of a copy of the underlying data. For example, the WAFL file system makes use of pointers to actual data blocks on disk and when data is updated, it does not rewrite existing blocks, but rather the updated data is stored in a new block and the pointer is updated. Since snapshots do not reference full copies of electronic files they can be performed (e.g., taken or created) very quickly. This use of block pointers allows access to older versions of volumes, files, directory hierarchies, and/or logical unit numbers (LUNs) with ease.

In order to facilitate recovery from an accidental deletion of data or an intentional deletion of data, for example, by ransomware, malware, or a malicious user, snapshots may be made incapable of modification and deletion until an associated retention time has expired, thereby facilitating data recovery based on the use of a retained locked snapshot taken prior to the deletion of data.

SUMMARY

Systems and methods are described for performing an instant recovery of data associated with a locked snapshot. According to one embodiment, a request is received by a storage system to recover data from a locked snapshot, containing a point-in-time image of a data protection volume, to a recovery volume in which the data protection volume includes one or more locked files. The recovery volume is created without making a copy of the one or more locked files by cloning the data protection volume. Usage of the recovery volume in read-write mode is facilitated by causing a background scanner to clear or remove data protection information associated with respective locked files of the one or more locked files.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
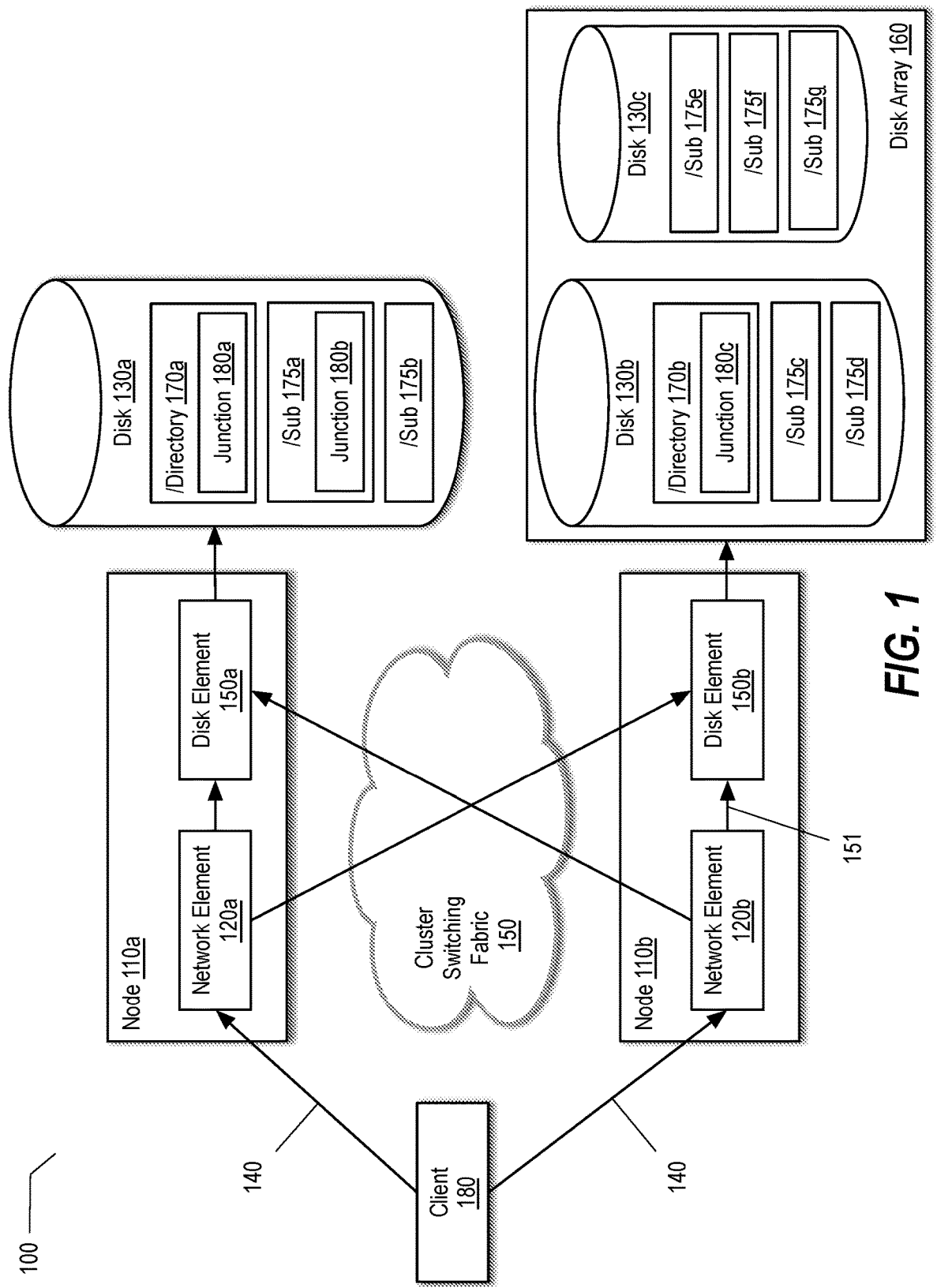
FIG. 1 is a block diagram illustrating a plurality of nodes interconnected as a cluster in accordance with an embodiment of the present disclosure.

Systems and methods are described for performing an instant recovery of data associated with a locked snapshot. The proposed approach of leveraging volume clone functionality to achieve instant recover of data associated with a locked snapshot was not possible previously due to certain implementation assumptions and aggregate limitations. For example, all volumes within a given aggregate previously needed to be of the same type (e.g., non-data-protection volumes or data protection volumes). Additionally, volume clones are stored within the same aggregate as the parent volume, leading to the need for the type of a volume clone to be the same as that of the source or parent volume. Given these prior limitations, traditionally, recovery of data associated with a locked snapshot stored on a given data protection volume necessitated the performance of a potentially time-intensive restore operation by storage and data replication software (e.g., a SnapMirror restore operation via SnapMirror storage and data replication software available from NetApp, Inc.) running on the storage system. Notably, such a restore operation makes an actual copy of the data from the given data protection volume to a new recovery volume. As such, depending on the amount of data to be recovered, the recovery process may take several hours, during which the customer of the storage system may be experiencing downtime waiting for the recovery process to be completed.

Various embodiments described herein seek to significantly reduce the amount of time for recovery of data associated with a locked snapshot by making use of enhanced volume cloning functionality instead of making an actual copy of the data to be recovered. In view of the recent support by some storage systems of unified aggregates (i.e., aggregates that may contain volumes of different types), volume cloning functionality may be enhanced as described herein to create a volume clone of any type (e.g., non-data-protection volumes or data protection volumes) within the same aggregate based on a parent volume of any type, thereby supporting creation of a recovery volume in the form of a volume clone of a data protection volume in which the type of the recovery volume is a non-data protection type and the previous WORM content is allowed to be modified. For example, in one embodiment, as described further below, the volume clone functionality may be extended to receive a parameter indicative of the desired type of the volume clone (e.g., which will represent the recovery volume). To allow the recovery volume to be used in read-write mode, a background scanner may be launched after the creation of the recovery volume to clear the data protection information (e.g., WORM flags and/or lock metafiles) that was previously used to protect the content from being changed when stored on the data protection volume. Additionally, to facilitate usage of the recovery volume in read-write mode, when accessing content from the recovery volume, the data protection information previously contained on the data protection volume (e.g., the point-in-time image of the dataset captured by the locked snapshot) to be recovered may be ignored and cleared as it is encountered (to the extent the content being accessed has not yet been processed by the background scanner), for example, as described further below with reference to FIG. 8. In some embodiments, any further volume cloning of a volume clone may be disabled until the background scanner completes removal of all data protection information from the volume clone.

While, for sake of illustration, various examples are described with reference to volume cloning of a flexible volume (e.g., a NetApp Flex Vol volume) that is loosely coupled to its containing aggregate and which can share its containing aggregate with other flexible volumes, it is to be appreciated the methodologies described herein also applicable to infinite volumes and flexgroup volumes (e.g., NetApp ONTAP FlexGroup volumes).

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider or hyperscaler (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein, a "storage system" or "storage appliance" generally refers to a type of computing appliance or node, in virtual or physical form, that provides data to, or manages data for, other computing devices or clients (e.g., applications). The storage system may be part of a cluster representing a distributed storage system. In various examples described herein, a storage system may be run (e.g., on a VM or as a containerized instance, as the case may be) within a public cloud provider.

As used herein a "cloud volume" generally refers to persistent storage that is accessible to a virtual storage system by virtue of the persistent storage being associated with a compute instance in which the virtual storage system is running. A cloud volume may represent a hard-disk drive (HDD) or a solid-state drive (SSD) from a pool of storage devices within a cloud environment that is connected to the compute instance through Ethernet or fibre channel (FC) switches as is the case for network-attached storage (NAS) or a storage area network (SAN). Non-limiting examples of cloud volumes include various types of SSD volumes (e.g., AWS Elastic Block Store (EBS) gp2, gp3, io1, and io2 volumes for EC2 instances) and various types of HDD volumes (e.g., AWS EBS st1 and sc1 volumes for EC2 instances).

An "aggregate" generally refers to an object that presents a collection of disks under a contiguous namespace, organized into one or more RAID groups.

As used herein a "snapshot" generally refers to a file representing a point-in-time image of a dataset (e.g., a volume or a LUN) containing metadata (e.g., that points to or otherwise identifies the underlying data) instead of including a copy of the underlying data. A snapshot may comprise a feature that creates an online, read-only copy of a file system. The snapshot may protect against accidental deletions or modifications of files without duplicating file contents. In some embodiments, a snapshot is utilized by a flexible volume clone to create a point in time view or image of a base flexible volume. When a file is changed, the snapshot copy (or resulting flexible volume clone) may still point to the storage device blocks where the file existed before it was modified and changes are written to new storage device blocks. As data is changed in the base flexible volume, the original data blocks stay associated with the snapshot copy rather than getting marked for reuse. A non-limiting example of a snapshot is a NetApp snapshot copy. Snapshots may be locked or unlocked. Locked snapshots are snapshots having an associated non-zero retention period and stored on a volume for which snapshot locking is enabled (which may also be referred to as snapshot retention being enabled). In various embodiments described herein, locked snapshots have corresponding data protection information (lock metafiles) associated therewith (e.g., stored in a private index node (inode) space so as to preclude deletion or modification of the locked snapshot until the current time is greater than or equal to the immutable retention time contained within the corresponding lock metafile. Snapshots may be locked (e.g., automatically) at the time they are created on a particular volume or may be locked subsequently, for example, responsive to a command received via a command-line interface (CLI) or invocation of a method of an application programming interface (API). Unlocked snapshots are snapshots having a non-zero retention period and stored on a volume for which locking is not enabled or having a retention period of zero.

As used herein a "snapshot policy" generally refers to a set of rules that controls creation, retention, mirroring, and/or expiration of snapshots. Snapshot policies may be used by a storage system administrator to facilitate the scheduling the creation of snapshots for volumes at specific intervals and the retention of snapshots based on their recovery point objectives (RPO). For example, when applied to a volume a snapshot schedule policy may specify one or more schedules (e.g., hourly, daily, weekly, monthly, etc.) on which snapshots are taken. Snapshots created in accordance with a rule associated with a given snapshot schedule policy may automatically be labeled with a label or tag associated with the snapshot schedule policy.

As used herein, a "data protection volume" generally refers to a volume that operates in WORM mode. Data protection volumes may be created and managed via a compliance solution offered by a storage system vendor, for example, to retain data and provided WORM protection for the retained data (e.g., locked files or WORM-locked files). For example, the compliance solution may create non-modifiable and non-erasable volumes to prevent locked files stored thereon from being altered or deleted until a set retention date (at a file-level, for example using a lock metafile, or at a volume- or disk-level, for example, using retention information associated with a given volume or disk). A destination data protection volume on which locked snapshots may be retained may be associated with a storage system remote from the originating or source storage system that created the original snapshot (e.g., in a disaster recovery (DR) configuration) or the destination data protection volume may be local to the originating or source storage system.

As used herein, "data protection information" generally refers to one or more flags and/or a collection of information that may be used to enforce limitations on modification and/or deletion of a locked file (or WORM-locked file). Non-limiting examples of data protection information include WORM flags and lock metafiles.

As used herein, a "locked file" or a "WORM-locked file" generally refer to a file that is protected by a WORM model. Locked files may be prevented from being deleted, modified, and/or overwritten for a fixed amount of time or indefinitely, for example, using one or both of data protection information and disk- or volume-level retention information.

As used herein, an "inode" generally refers to a file data structure maintained by a file system that stores metadata for disk files. An inode may include, among other things, location, file size, permissions needed to access a given file with which it is associated as well as creation, read, and write timestamps, and one or more WORM flags.

As used herein, a "WORM flag" generally refers to a flag stored in an inode that is associated with a given file that is indicative of existence of a particular limitation relating to overwriting, modification, and/or deletion of the given file. Non-limiting examples of WORM flags include "WORM," "WORM_APPEND," and "WORM_LOG." When set, the "WORM" flag may indicate it is impermissible to modify, delete, or overwrite the associated locked file. When set, the "WORM_APPEND" flag may indicate it is impermissible to overwrite or delete the associated locked file, but it is permissible to append data to the file, for example, to the end of the file. When set, the "WORM_LOG" flag may indicate reads from and/or attempts to write to the associated locked file are to be logged. Depending on the particular implementation, more or fewer WORM flags may be used.

As used herein, a "lock metafile" generally refers to a metafile associated with a file (e.g., a locked snapshot) to preclude modification and/or deletion of the file until the current time (e.g., as indicated by a secure time base, such as a tamper-proof timer) is greater than or equal to a retention time specified in the lock metafile. In various examples described herein, lock metafiles are used to enforce immutability of locked snapshots during a defined retention time period and may be stored in a private inode space that is not accessible to end users. While in the context of various examples, lock metafiles are described as being used in connection with locked snapshots, lock metafiles may also be used with other types of files (e.g., files associated with word-processing applications (e.g., .docx files), image files, text files, portable document format (PDF) files, multimedia files, and others) when such files are desired to be retained for an associated retention period at the file level by creating corresponding lock metafiles.

As used herein, a "volume clone" or a "clone volume" generally refers to a writable, space-efficient, point-in-time copy of a storage object (e.g., a parent volume representing a data protection volume). A volume clone is space-efficient because it share the same data blocks with its parent volume, thereby referring to the common data by reference rather than making an actual copy of the common data. A non-limiting example of a volume clone is a FlexClone volume by NetApp, Inc. In examples described herein, when data is recovered from a locked snapshot using volume clone functionality to make a volume clone of a data protection volume, a background scanner may be used to clear data protection information (e.g., WORM flags and/or lock metafiles) that were previously used to protect the content from being changed when stored on the data protection volume, thereby allowing the volume clone to be used in read-write mode. Additionally, as described further below, in some embodiments, when accessing content from a non-data protection volume (e.g., one not operating in WORM mode), the data protection information (e.g., WORM flags and/or lock metafiles) may be ignored and cleared as they are encountered (to the extent the content being accessed has not yet been processed by the background scanner). A volume clone may comprise an instant replication of a storage object without requiring additional storage space at the time of creation. For example, a volume clone of a storage object may comprise a transparent virtual copy of data of the storage object and does not require any copying of data. A volume clone of a storage object may be derived from and be based on the storage object. For example, the volume clone may comprise a virtual image of the storage object, a pointer to the storage object, or a pointer to an image of the storage object. In some embodiment, a volume clone may comprise a virtual image or a pointer to the base storage object. As such, a volume clone may comprise a virtual container that may be provisioned, sized, and resized dynamically to simplify operations. Notably, incremental storage capacity is only needed for clone-specific metadata and nonredundant data blocks. In some embodiments, the volume clone stores data comprising changes between the base storage object and the clone. When a volume clone is created, it uses the base storage object and/or a snapshot image of the base storage object as its base. For example, a volume clone may comprise a pointer to an image of a storage object and delta data, whereby the volume clone is produced at a first time and modifications are performed to the volume clone at a second time after the first time. The delta data of the volume clone may comprise changes to made to the volume clone between the first time and the second time. Thus, storage device space is saved because new device space used for the volume clone is associated with small amounts of metadata or meaningful changes to the volume clone. Thus, the volume clone may comprise a writeable point-in-time image of a base storage object or even of another clone of a base storage object. As such, volume clones add a new level of agility and efficiency to storage operations. For illustrative purposes, various examples may be described herein in relation to a volume clone of a flexible volume; however, in other examples, any other type of volume clone may be used.

As used herein, a "storage object clone hierarchy" generally refers to a definition of a relationship between various base storage objects and their corresponding clones. Storage object clone hierarchy data may comprise data that describes/indicates the hierarchical relationship of base storage objects and their respective clones. For example, flexible volume clone hierarchy may comprise a definition of a relationship between various base flexible volumes and flexible volume clones. For example, the flexible volume hierarchy may comprise information that details the hierarchical relationship of base flexible volumes and flexible volume clones. As such, the flexible volume hierarchy is the relationship between base flexible volumes and flexible volume clones.

As used herein, a "flexible volume" generally refers to a type of storage volume that may be efficiently distributed across multiple storage devices. A flexible volume may be capable of being resized to meet changing business or application requirements. In some embodiments, a storage system may provide one or more aggregates and one or more storage volumes distributed across a plurality of nodes interconnected as a cluster. Each of the storage volumes may be configured to store data such as files and logical units. As such, in some embodiments, a flexible volume may be comprised within a storage aggregate and further comprises at least one storage device. The storage aggregate may be abstracted over a RAID plex where each plex comprises a RAID group. Moreover, each RAID group may comprise a plurality of storage disks. As such, a flexible volume may comprise data storage spread over multiple storage disks or devices. A flexible volume may be loosely coupled to its containing aggregate. A flexible volume can share its containing aggregate with other flexible volumes. Thus, a single aggregate can be the shared source of all the storage used by all the flexible volumes contained by that aggregate. A non-limiting example of a flexible volume is a NetApp ONTAP Flex Vol volume.

As used herein, a "flexgroup volume" generally refers to a single namespace that is made up of multiple constituent/member volumes. A non-limiting example of a flexgroup volume is a NetApp ONTAP FlexGroup volume that can be managed by storage administrators, and which acts like a NetApp Flex Vol volume. In the context of a flexgroup volume, "constituent volume" and "member volume" are interchangeable terms that refer to the underlying volumes (e.g., flexible volumes) that make up the flexgroup volume.

Example Distributed Storage System Cluster

FIG. 1 is a block diagram illustrating a plurality of nodes 110a-b interconnected as a cluster 100 in accordance with an embodiment of the present disclosure. The nodes 110a-b comprise various functional components that cooperate to provide a distributed storage system architecture of the cluster 100. To that end, in the context of the present example, each node is generally organized as a network element (e.g., network element 120a or 120b) and a disk element (e.g., disk element 150a or 150b). The network element includes functionality that enables the node to connect to clients (e.g., client 180) over a computer network 140, while each disk element 350 connects to one or more storage devices, such as disks 130 of a disk array 160. The nodes 110a-b are interconnected by a cluster switching fabric 151 which, in an example, may be embodied as a Gigabit Ethernet switch. It should be noted that while there is shown an equal number of network and disk elements in the illustrative cluster 100, there may be differing numbers of network and/or disk elements. For example, there may be a plurality of network elements and/or disk elements interconnected in a cluster configuration 100 that does not reflect a one-to-one correspondence between the network and disk elements. As such, the description of a node comprising one network element and one disk element should be taken as illustrative only.

Clients may be general-purpose computers configured to interact with the node in accordance with a client/server model of information delivery. That is, each client (e.g., client 180) may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (ISCSI) and SCSI encapsulated over Fibre Channel (FCP), when accessing information in the form of blocks. In various examples described herein, an administrative user (not shown) of the client may make use of a user interface (UI) presented by the cluster or a command line interface (CLI) of the cluster to, among other things, establish a data protection relationship between a source volume and a destination volume (e.g., a mirroring relationship specifying one or more policies associated with creation, retention, and transfer of snapshots), defining snapshot and/or backup policies, and association of snapshot policies with snapshots.

Disk elements 150a and 150b are illustratively connected to disks 130a-c (which may be referred to collectively as disks 130), that may be organized into disk arrays 160. Alternatively, storage devices other than disks may be utilized, e.g., flash memory, optical storage, solid state devices, etc. As such, the description of disks should be taken as exemplary only. As described below, in reference to FIG. 3, a file system may implement multiple flexible volumes on the disks 130. Flexible volumes may comprise multiple directories 170a-b and multiple subdirectories 175a-g. Junctions 180a-c may be located in directories 170 and/or subdirectories 175. It should be noted that the distribution of directories 170, subdirectories 175 and junctions 180 shown in FIG. 1 is for illustrative purposes. As such, the description of the directory structure relating to subdirectories and/or junctions should be taken as exemplary only.

Example Storage System Node

Figure 2:
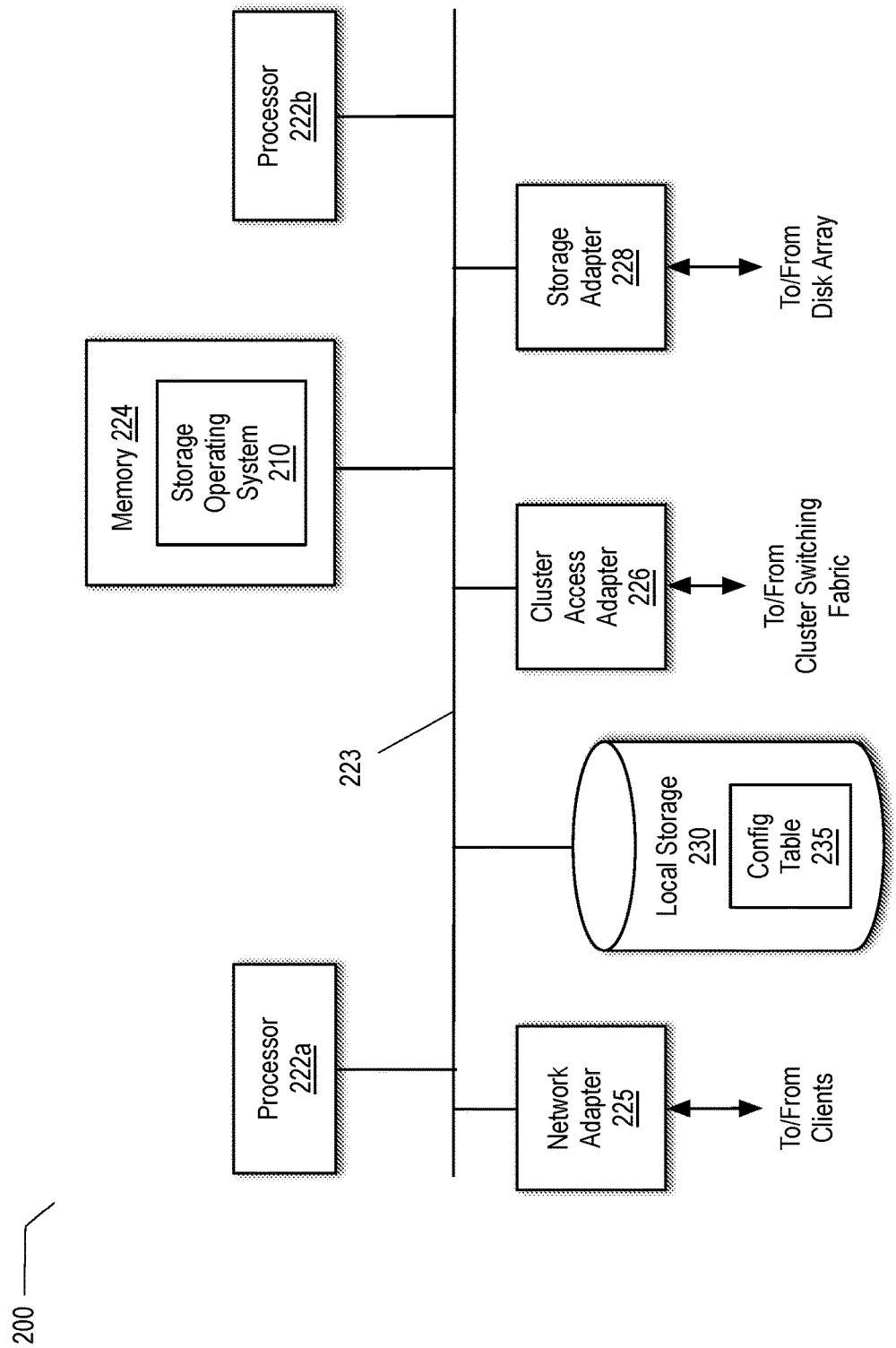
FIG. 2 is a block diagram illustrating a node in accordance with an embodiment of the present disclosure.

FIG. 2 is a block diagram of a node 200 that is illustratively embodied as a storage system comprising a plurality of processors (e.g., processors 222a-b), a memory 224, a network adapter 225, a cluster access adapter 226, a storage adapter 228 and local storage 230 interconnected by a system bus 223. Node 200 may be analogous to nodes 110a and 110b of FIG. 1. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster (e.g., cluster 100). Illustratively, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, the cluster access adapter 226 is utilized by the network and disk element for communicating with other network and disk elements in the cluster.

In the context of the present example, each node 200 is illustratively embodied as a dual processor storage system executing a storage operating system 210 that implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor (e.g., processor 222a) may execute the functions of the network element (e.g., network element 120a or 120b) on the node, while the other processor (e.g., processor 222b) may execute the functions of the (e.g., disk element 150a or 150b).

The memory 224 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. The storage operating system 210, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

The network adapter 225 comprises a plurality of ports adapted to couple the node 200 to one or more clients (e.g., client 180) over point-to-point links, wide area networks, virtual private networks implemented over a public network (Internet) or a shared local area network. The network adapter 225 thus may comprise the mechanical, electrical and signaling circuitry needed to connect the node to a network (e.g., computer network 140). Illustratively, the network may be embodied as an Ethernet network or a Fibre Channel (FC) network. Each client (e.g., client 180) may communicate with the node over network by exchanging discrete frames or packets of data according to pre-defined protocols, such as TCP/IP.

The storage adapter 228 cooperates with the storage operating system 210 executing on the node 200 to access information requested by the clients. The information may be stored on any type of attached array of writable storage device media such as video tape, optical, DVD, magnetic tape, bubble memory, electronic random access memory, micro-electromechanical and any other similar media adapted to store information, including data and parity information. However, as illustratively described herein, the information is stored on disks (e.g., disks 130 of array 160). The storage adapter comprises a plurality of ports having input/output (I/O) interface circuitry that couples to the disks over an I/O interconnect arrangement, such as a conventional high-performance, FC link topology.

Storage of information on each array (e.g., array 160) may be implemented as one or more storage "volumes" that comprise a collection of physical storage disks (e.g., disks 130) cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

While in the context of the present example, the node may be a physical host, it is to be appreciated the node may be implemented in virtual form. For example, a storage system may be run (e.g., on a VM or as a containerized instance, as the case may be) within a public cloud provider. As such, a cluster representing a distributed storage system may be comprised of multiple physical nodes (e.g., node 200) or multiple virtual nodes (virtual storage systems).

Example Storage Operating System

To facilitate access to the disks (e.g., disks 130), a storage operating system (e.g., storage operating system 300, which may be analogous to storage operating system 210) may implement a write-anywhere file system that cooperates with one or more virtualization modules to "virtualize" the storage space provided by disks. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

Illustratively, the storage operating system may be the Data ONTAP operating system available from NetApp, Inc., San Jose, Calif. that implements a Write Anywhere File Layout (WAFL) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this disclosure.

Figure 3:
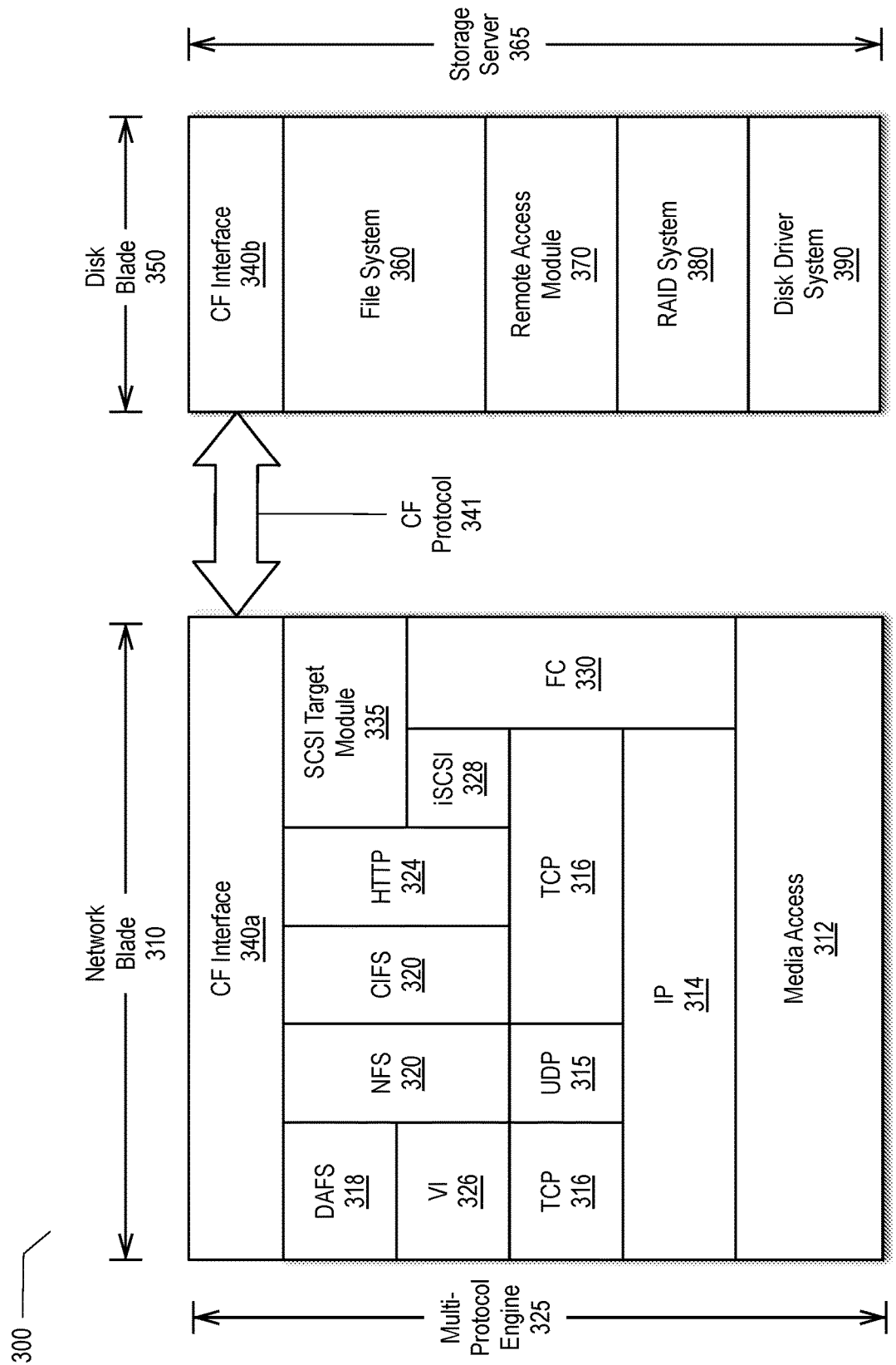
FIG. 3 is a block diagram illustrating a storage operating system in accordance with an embodiment of the present disclosure.

FIG. 3 is a block diagram illustrating a storage operating system 300 in accordance with an embodiment of the present disclosure. In the context of the present example, the storage operating system 300 is shown including a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node (e.g., node 200).

In addition, the storage operating system includes a series of software layers organized to form a storage server 365 that provides data paths for accessing information stored on the disks (e.g., disks 130) of the node. To that end, the storage server 365 includes a file system module 360 in cooperating relation with a remote access module 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, for example, a virtual disk (vdisk) module (not shown) and a SCSI target module 335. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements an exemplary a file system having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client (e.g., client 180) is forwarded as a packet over a computer network (e.g., computer network 140) and onto a node (e.g., node 200) where it is received at a network adapter (e.g., network adaptor 225). A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

The remote access module 370 is operatively interfaced between the file system module 360 and the RAID system module 380. Remote access module 370 is illustratively configured as part of the file system to implement the functionality to determine whether a newly created data container, such as a subdirectory, should be stored locally or remotely. Alternatively, the remote access module 370 may be separate from the file system. As such, the description of the remote access module being part of the file system should be taken as exemplary only. Further, the remote access module 370 determines which remote flexible volume should store a new subdirectory if a determination is made that the subdirectory is to be stored remotely. More generally, the remote access module 370 implements the heuristics algorithms used for the adaptive data placement. However, it should be noted that the use of a remote access module should be taken as illustrative. In alternative aspects, the functionality may be integrated into the file system or other module of the storage operating system. As such, the description of the remote access module 370 performing certain functions should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Alternatively, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node (e.g., node 200), implement data access semantics of a general purpose operating system. The storage operating system can also be implemented as a microkernel, an application program operating over a general-purpose operating system, such as UNIX or Windows NT, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Example Cluster Fabric (CF) Protocol

Illustratively, the storage server 365 is embodied as disk element (or disk blade 350, which may be analogous to disk element 150a or 150b) of the storage operating system 300 to service one or more volumes of array 160. In addition, the multi-protocol engine 325 is embodied as network element (or network blade 310, which may be analogous to network element 120a or 120b) to (i) perform protocol termination with respect to a client issuing incoming data access request packets over the network (e.g., network 140), as well as (ii) redirect those data access requests to any storage server 365 of the cluster (e.g., cluster 100). Moreover, the network element 310 and disk element 350 cooperate to provide a highly scalable, distributed storage system architecture of the cluster. To that end, each module includes a cluster fabric (CF) interface module (e.g., CF interface 340a and 340b) adapted to implement intra-cluster communication among the modules, including disk element to disk element communication for data container striping operations described herein.

The protocol layers, e.g., the NFS/CIFS layers and the iSCSI/IFC layers, of the network element 310 function as protocol servers that translate file-based and block based data access requests from clients into CF protocol messages used for communication with the disk element 350. That is, the network element servers convert the incoming data access requests into file system primitive operations (commands) that are embedded within CF messages by the CF interface module 340 for transmission to the disk elements of the cluster. Notably, the CF interface modules 340 cooperate to provide a single file system image across all disk elements in the cluster. Thus, any network port of a network element that receives a client request can access any data container within the single file system image located on any disk element of the cluster.

Further, in an illustrative aspect of the disclosure, the network element and disk element are implemented as separately scheduled processes of storage operating system 300; however, in an alternate aspect, the modules may be implemented as pieces of code within a single operating system process. Communication between a network element and disk element is thus illustratively effected through the use of message passing between the modules although, in the case of remote communication between a network element and disk element of different nodes, such message passing occurs over a cluster switching fabric (e.g., cluster switching fabric 151). A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc.

The CF interface module 340 implements the CF protocol for communicating file system commands among the modules of cluster. Communication is illustratively effected by the disk element exposing the CF API to which a network element (or another disk element) issues calls. To that end, the CF interface module 340 is organized as a CF encoder and CF decoder. The CF encoder of, e.g., CF interface 340*a* on network element 310 encapsulates a CF message as (i) a local procedure call (LPC) when communicating a file system command to a disk element 350 residing on the same node 200 or (ii) a remote procedure call (RPC) when communicating the command to a disk element residing on a remote node of the cluster 100. In either case, the CF decoder of CF interface 340*b* on disk element 350 de-encapsulates the CF message and processes the file system command.

Illustratively, the remote access module 370 may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that conveys file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., a network element 310) to a destination (e.g., a disk element 350). The RC layer implements a reliable transport protocol that is adapted to process such envelopes in accordance with a connectionless protocol, such as UDP.

Example File System Organization

In one embodiment, a data container is represented in the write-anywhere file system as an inode data structure adapted for storage on the disks (e.g., disks 130). In such an embodiment, an inode includes a meta-data section and a data section. The information stored in the meta-data section of each inode describes the data container (e.g., a file, a snapshot, etc.) and, as such, includes the type (e.g., regular, directory, vdisk) of file, its size, time stamps (e.g., access and/or modification time) and ownership (e.g., user identifier (UID) and group ID (GID), of the file, and a generation number. The contents of the data section of each inode may be interpreted differently depending upon the type of file (inode) defined within the type field. For example, the data section of a directory inode includes meta-data controlled by the file system, whereas the data section of a regular inode includes file system data. In this latter case, the data section includes a representation of the data associated with the file.

Specifically, the data section of a regular on-disk inode may include file system data or pointers, the latter referencing 4 KB data blocks on disk used to store the file system data. Each pointer is preferably a logical vbn to facilitate efficiency among the file system and the RAID system when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section of the inode (e.g., a second level inode) references an indirect block (e.g., a first level L1 block) that contains 1024 pointers, each of which references a 4 KB data block on disk. For file system data having a size greater than 64 MB, each pointer in the data section of the inode (e.g., a third level L3 inode) references a double-indirect block (e.g., a second level L2 block) that contains 1024 pointers, each referencing an indirect (e.g., a first level L1) block. The indirect block, in turn, which contains 1024 pointers, each of which references a 4 kB data block on disk. When accessing a file, each block of the file may be loaded from disk into memory (e.g., memory 224). In other embodiments, higher levels are also possible that may be used to handle larger data container sizes.

When an on-disk inode (or block) is loaded from disk into memory, its corresponding in-core structure embeds the on-disk structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree that provides an internal representation of blocks for a file loaded into memory and maintained by the write-anywhere file system 360. A root (top-level) buffer, such as the data section embedded in an inode, references indirect (e.g., level 1) blocks. In other embodiments, there may be additional levels of indirect blocks (e.g., level 2, level 3) depending upon the size of the file. The indirect blocks (e.g., and inode) includes pointers that ultimately reference data blocks used to store the actual data of the file. That is, the data of file are contained in data blocks and the locations of these blocks are stored in the indirect blocks of the file. Each level 1 indirect block may include pointers to as many as 1024 data blocks. According to the "write anywhere" nature of the file system, these blocks may be located anywhere on the disks.

In one embodiment, a file system layout is provided that apportions an underlying physical volume into one or more virtual volumes (or flexible volumes) of a storage system, such as node 200. In such an embodiment, the underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In a further embodiment, pvbns are used as block pointers within buffer trees of files stored in a flexible volume. This "hybrid" flexible volume example involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

In a dual vbn hybrid flexible volume example, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks.

A root (top-level) buffer, such as the data section embedded in an inode, references indirect (e.g., level 1) blocks. Note that there may be additional levels of indirect blocks (e.g., level 2, level 3) depending upon the size of the file. The indirect blocks (and inode) include pvbn/vvbn pointer pair structures that ultimately reference data blocks used to store the actual data of the file. The pvbns reference locations on disks of the aggregate, whereas the vvbns reference locations within files of the flexible volume. The use of pvbns as block pointers in the indirect blocks provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Example Aggregate

Figure 4:
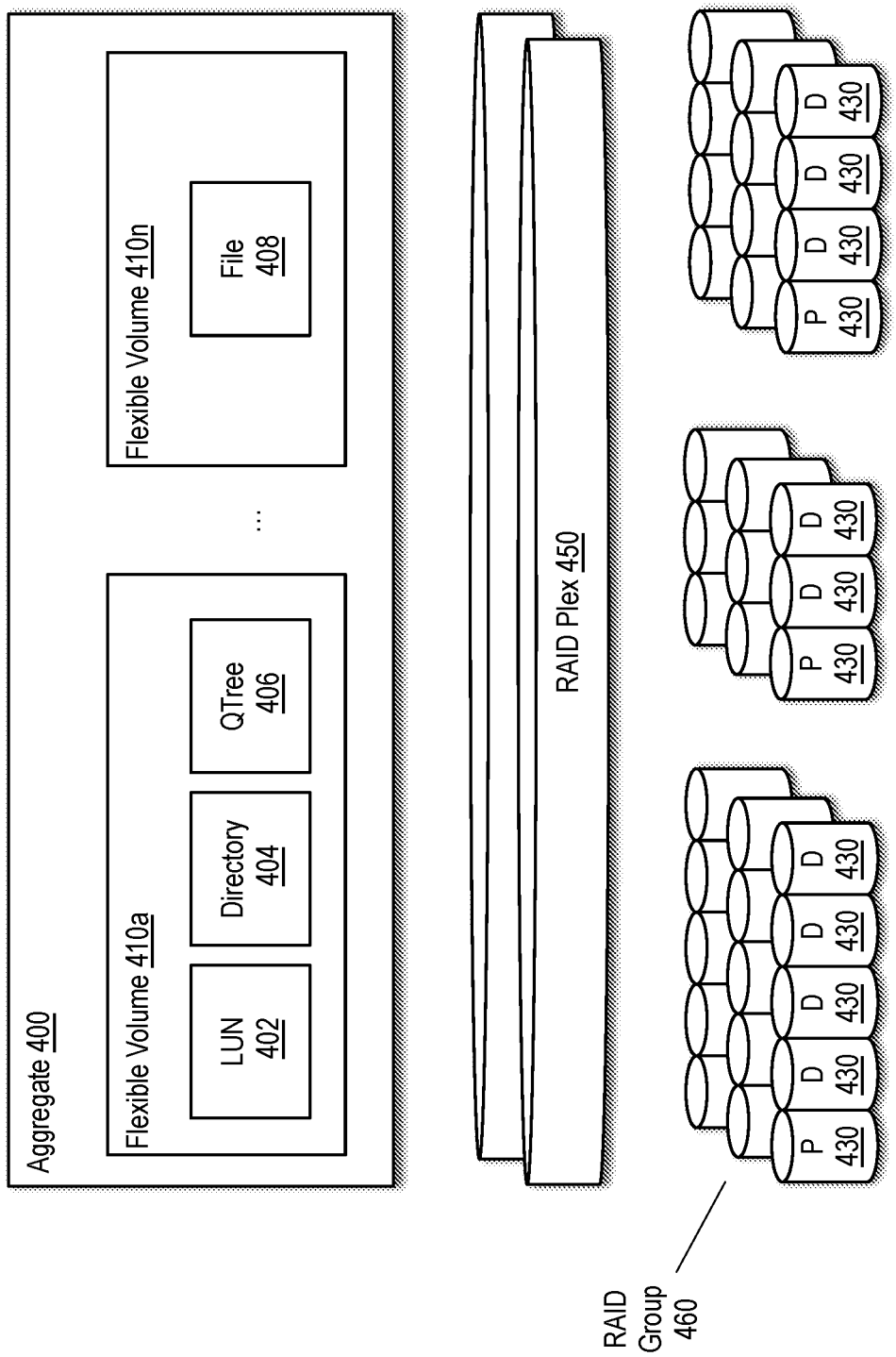
FIG. 4 is a block diagram illustrating an aggregate in accordance with an embodiment of the present disclosure.

FIG. 4 is a block diagram illustrating an aggregate 400 in accordance with an embodiment of the present disclosure. Luns (blocks) 402, directories 404, quota trees (QTrees) 406 and files 408 may be included within flexible volumes 410, such as dual vbn flexible volumes, that, in turn, are contained within the aggregate 400. According to one embodiment, the aggregate 400 is a unified aggregate, thereby allowing different types of volumes (e.g., non-data-protection volumes and data protection volumes) to be contained within the same aggregate. In one embodiment, the flexible volumes 410 include elements within the flexible volumes that may comprise junctions to provide redirection information to other flexible volumes, which may be contained within the same aggregate 400, may be stored in aggregate service by other key modules in the distributed file system. The description of elements being stored within a flexible volume 410 should be taken as exemplary only. The aggregate 400 is illustratively layered on top of the RAID system, which is represented by at least one RAID plex 450 (depending upon whether the storage configuration is mirrored), wherein each plex 450 comprises at least one RAID group 460. Each RAID group further comprises a plurality of disks 430, e.g., one or more data (D) disks and at least one (P) parity disk, which may be analogous to disks 130a-c of FIG. 1.

Whereas the aggregate 400 is analogous to a physical volume of a conventional storage system, a flexible volume is analogous to a file within that physical volume. That is, the aggregate 400 may include one or more files, wherein each file contains a flexible volume 410 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 410 is also a logical volume, it has its own block allocation structures (e.g., active, space and summary maps) in its vvbn space.

A container file is a file in the aggregate that includes all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories for flexible volumes.

Specifically, a physical file system directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

According to one embodiment, the aggregate 400 may be a unified aggregate (i.e., an aggregate that may contain volumes of different types). A unified aggregate may include one or more volumes of different types (e.g. one or more non-data-protection volumes and/or one or more data protection volumes). In order to ensure aggregate-level WORM properties are updated accurately and a unified aggregate is not deleted while containing any data protection volumes, one or more counters may be maintained at the aggregate-level to keep track of the number of data protection volumes within the unified aggregate. These counters may be updated during volume creation and deletion and may be maintained as in memory counters. On a system boot, the counters will be incremented appropriately when aggregates are mounted.

In one embodiment, protections against intentional or unintentional destruction of data may also be implemented at the disk level. For example, disk may be protected by means of a RAID label that marks disks as being part of an aggregate that includes one or more data protection volumes. Furthermore, hooks associated with disk-level operations (e.g., formatting and the like) may be used to prevent any tampering with such disks.

Example On-Disk Representation of an Aggregate

Figure 5:
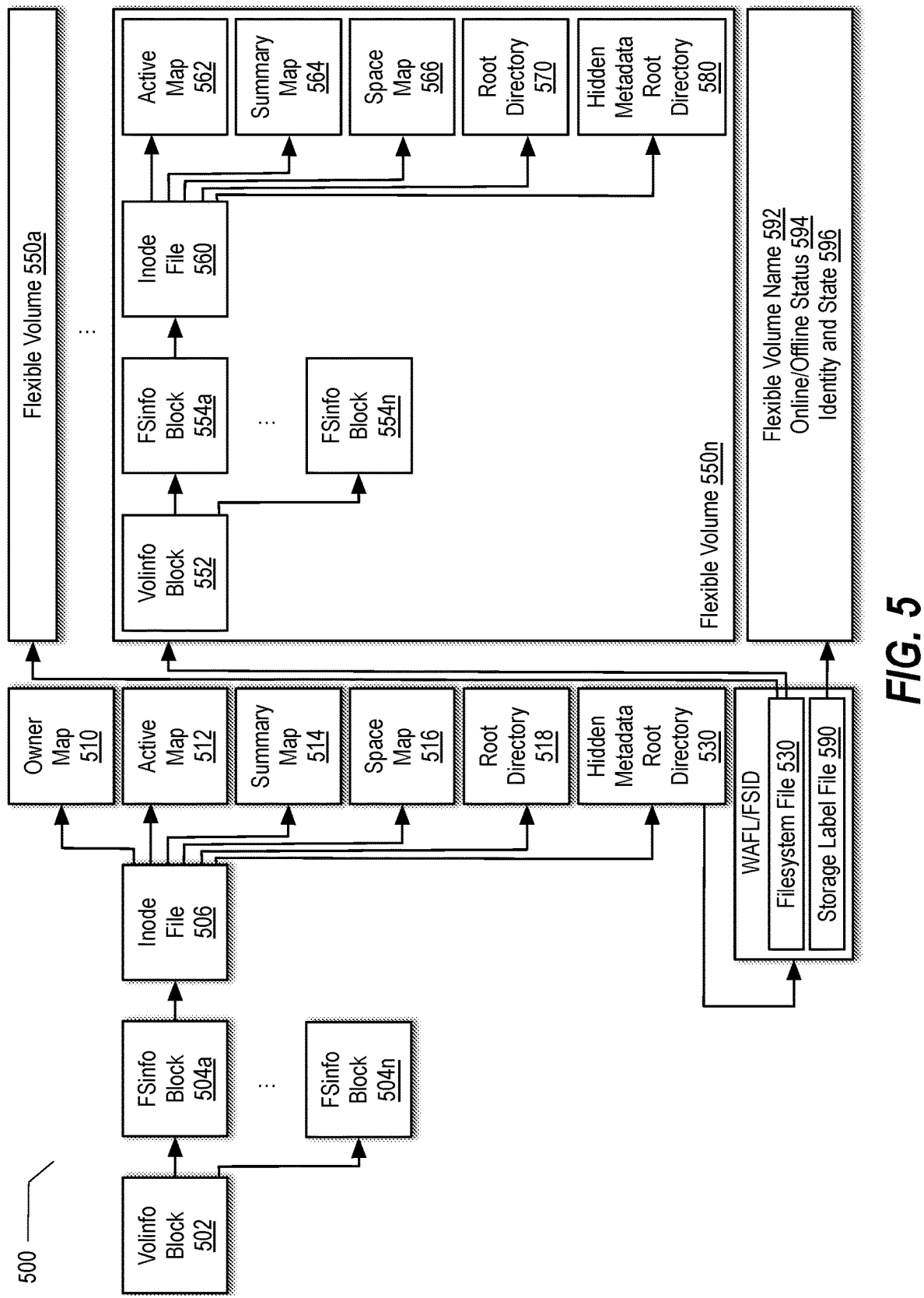
FIG. 5 is a block diagram illustrating an on-disk layout of an aggregate in accordance with an embodiment of the present disclosure.

FIG. 5 is a block diagram illustrating an on-disk layout of an aggregate 500 in accordance with an embodiment of the present disclosure. The storage operating system (e.g., storage operating system 300) or more specifically, the RAID system (e.g., RAID system 380), assembles a physical volume of pvbns to create the aggregate 500 (which may be analogous to aggregate 400), with pvbns 1 and 2 comprising a "physical" volinfo block 502 for the aggregate. The volinfo block 502 contains block pointers to fsinfo blocks 504, each of which may represent a snapshot of the aggregate. Each fsinfo block 504 includes a block pointer to an inode file 506 that contains inodes of a plurality of files, including an owner map 510, an active map 512, a summary map 514 and a space map 516, as well as other special meta-data files. The inode file 506 further includes a root directory 520 and a "hidden" meta-data root directory 530, the latter of which includes a namespace having files related to a flexible volume in which users cannot "see" the files. The hidden meta-data root directory includes the WAFL/fsid/directory structure that contains file system file 540 and storage label file 590. Note that root directory 520 in the aggregate is empty; all files related to the aggregate are organized within the hidden meta-data root directory 530. In various examples described herein, the hidden meta-data root directory 530 may represent a non-limited example of a private inode space (e.g., not accessible to end users and being accessible to a limited number of workflows of the storage system) in which private (or "locked") metafiles associated with snapshots may be stored to enforce immutability of snapshots during a defined retention time period. For example, a retention time may be stored in a lock metafile associated with a snapshot to preclude modification and/or deletion of the snapshot until the current time (e.g., as indicated by a secure time base, such as a tamper-proof timer) is greater than or equal to the retention time. In this manner, snapshots may be retained (e.g., on a source volume and/or on a destination volume in locked or read-only form) to facilitate recovery from an event resulting in data loss, such as an accidental or intentional deletion of data, a ransomware attack, malware, or other cybersecurity threats.

In addition to being embodied as a container file having level 1 blocks organized as a container map, the file system file 540 includes block pointers that reference various file systems embodied as flexible volumes 550. Each flexible volume 550 has special reserved inode numbers within its flexible volume space that are used for, among other things, the block allocation bitmap structures. As noted, the block allocation bitmap structures, e.g., active map 562, summary map 564 and space map 566, are located in each flexible volume.

Specifically, each flexible volume 550 has the same inode file structure/content as the aggregate, with the exception that there is no owner map and no WAFL/fsid/file system file, storage label file directory structure in a hidden meta-data root directory 580. To that end, each flexible volume 550 has a volinfo block 552 that points to one or more fsinfo blocks 554, each of which may represent a snapshot, along with the active file system of the flexible volume. Each fsinfo block, in turn, points to an inode file 560 that, as noted, has the same inode structure/content as the aggregate with the exceptions noted above. Each flexible volume 550 has its own inode file 560 and distinct inode space with corresponding inode numbers, as well as its own root directory 570 and subdirectories of files that can be exported separately from other flexible volumes.

The storage label file 590 contained within the hidden meta-data root directory 530 of the aggregate is a small file that functions as an analog to a conventional raid label. A raid label includes physical information about the storage system, such as the volume name; that information is loaded into the storage label file 590. Illustratively, the storage label file 590 includes the name 592 of the associated flexible volume 550, the online/offline status 594 of the flexible volume, and other identity and state information 596 of the associated flexible volume (whether it is in the process of being created or destroyed).

Example File System Layout

Figure 6:
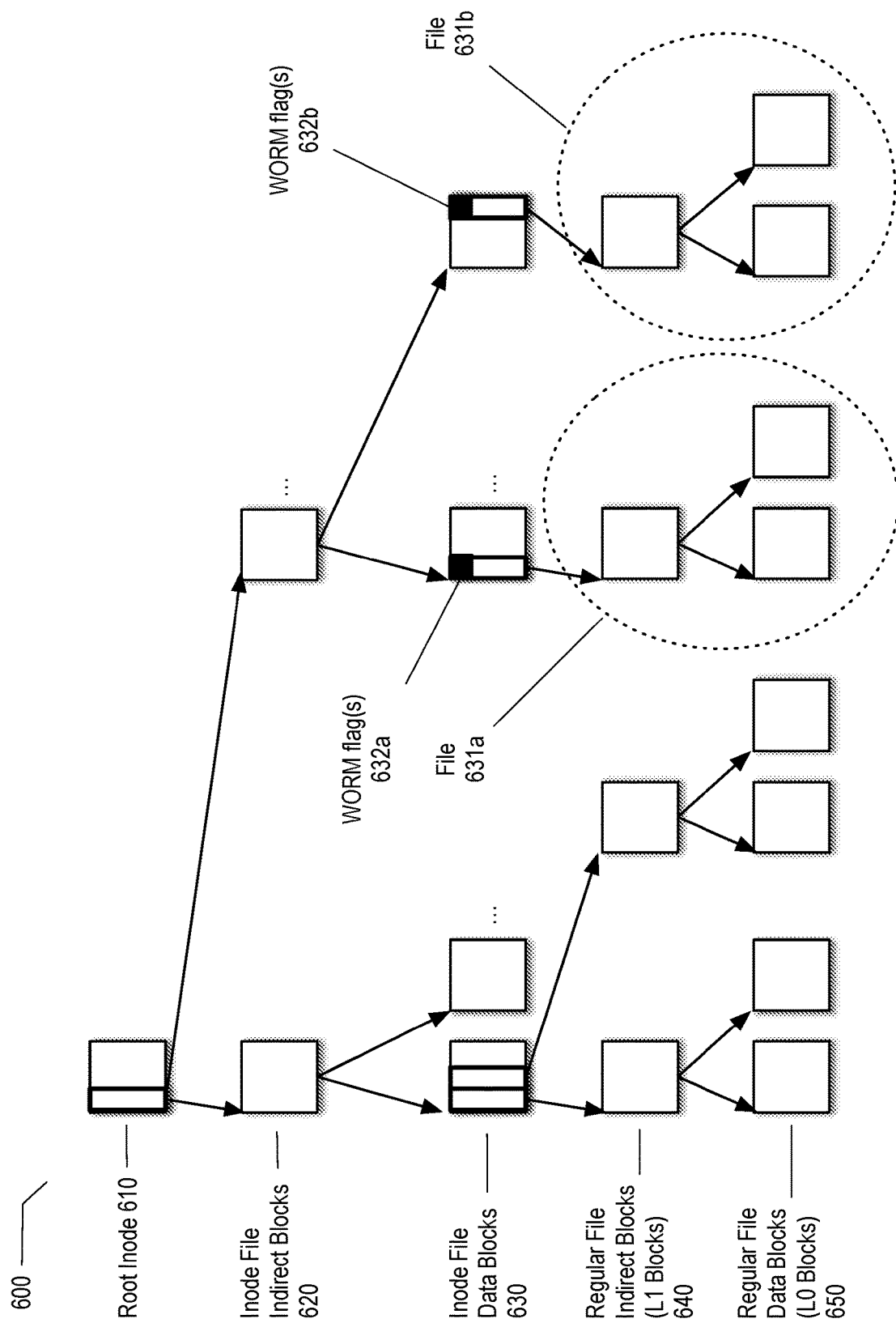
FIG. 6 is a block diagram illustrating a tree of blocks representing of an example a file system layout in accordance with an embodiment of the present disclosure.

FIG. 6 is a block diagram illustrating a tree of blocks 600 representing of an example a file system layout in accordance with an embodiment of the present disclosure. In one embodiment, the data storage system nodes (e.g., data storage systems 110a-b) make use of a write anywhere file system (e.g., the write anywhere file layout (WAFL) file system available from NetApp, Inc. of San Jose, CA). The write anywhere file system may represent a UNIX compatible file system that is optimized for network file access. In the context of the present example, the write anywhere file system is a block-based file system that represents file system data (e.g., a block map file and an inode map file), meta-data files, and regular files in the tree of blocks 600. Keeping meta-data in files allows the file system to write meta-data blocks anywhere on disk and makes it easier to increase the size of the file system on the fly.

The tree of blocks 600 has a root inode 610, which describes the inode map file (not shown), made up of inode file indirect blocks 620 and inode file data blocks 630. In this example, the file system uses inodes (e.g., inode file data blocks 630) to describe files (e.g., file 631a and file 631b). In one embodiment, each inode contains 16 block pointers to indicate which blocks (e.g., of 4 KB) belong to a given file. Inodes for files smaller than 64 KB may use the 156 block pointers to point to file data blocks or simply data blocks (e.g., regular file data blocks 650, which may also be referred to herein as L0 blocks). Inodes for files smaller than 64 MB may point to indirect blocks (e.g., regular file indirect blocks 640, which may also be referred to herein as L1 blocks), which point to actual file data. Inodes for larger files may point to doubly indirect blocks. For very small files, data may be stored in the inode itself in place of the block pointers.

In the context of the present example, locked files (e.g., files 631a and 631b) are each associated with one or more WORM flags (e.g., WORM flag(s) 632a and 632b). For example, WORM flag(s) 632a may indicate certain limitations or restrictions relating to modification and/or deletion of file 631a and WORM flag(s) 632b made indicate certain limitations or restrictions relating to modification and/or deletion of file 631b. Non-limiting examples of the one or more WORM flags include. In one embodiment, the one or more WORM flags include "WORM," "WORM_AP- PEND," and "WORM_LOG." Before allowing a given file to be overwritten, deleted, or modified, any WORM flags associated with the given file should be consulted to determine whether the requested operation is permissible.

Example Source Cluster and Destination Cluster

Figure 7:
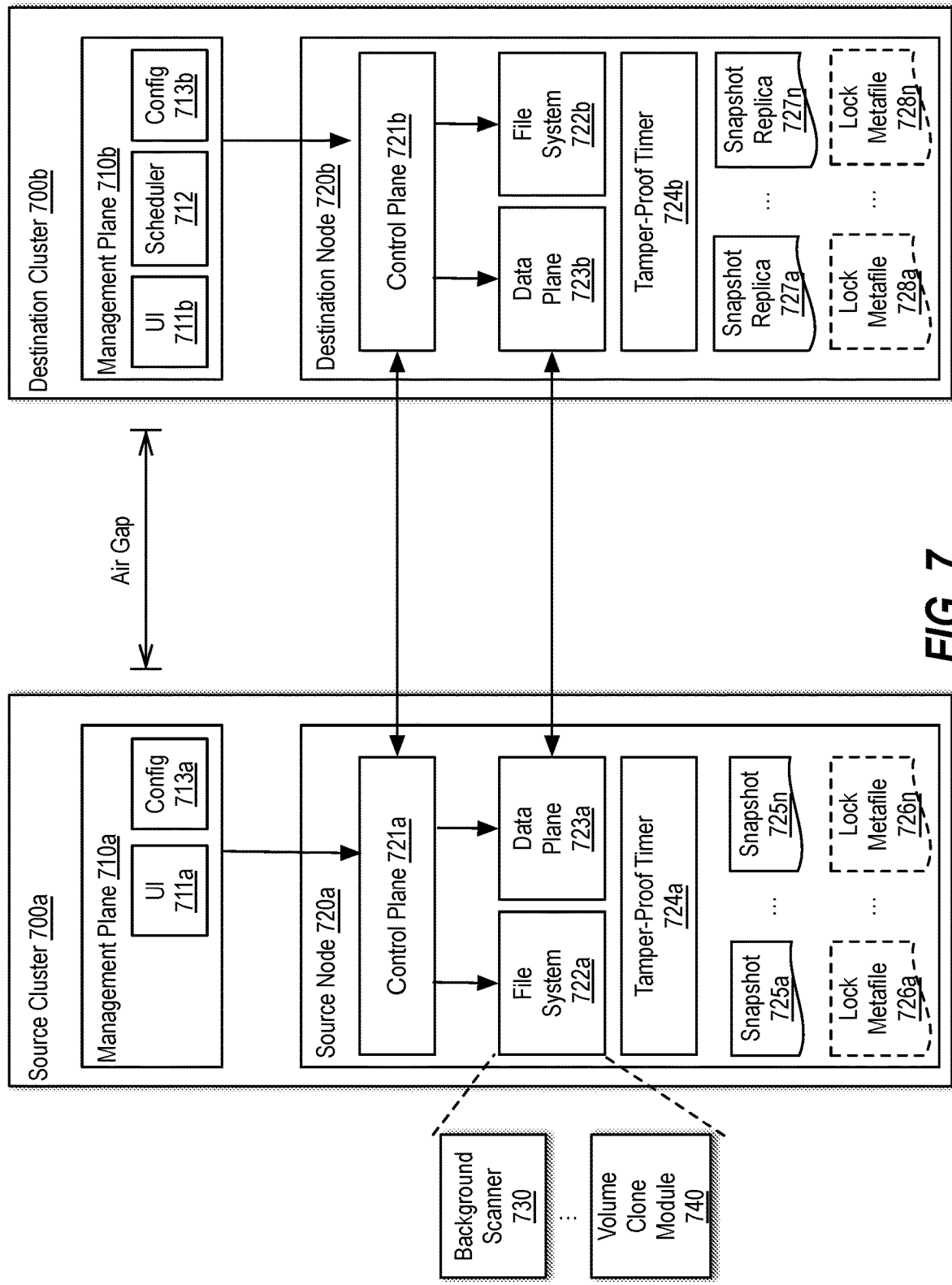
FIG. 7 is a block diagram illustrating a high-level architecture of a source cluster and a destination cluster in accordance with an embodiment of the present disclosure.

FIG. 7 is a block diagram illustrating a high-level architecture of a source cluster 700a (e.g., a primary distributed storage system) and a destination cluster 700b (e.g., a secondary distributed storage system) in accordance with an embodiment of the present disclosure. In the context of the present example, source cluster 700a and destination cluster 700b are each shown with respective management planes (e.g., management planes 710a and 710b), respective nodes (e.g., a source node 720a and a destination node 720b). The source cluster 700a and destination cluster 700b may be analogous to cluster 100 and the source node 720a and the destination node 720b may be analogous to node 200. While in the context of the present example, only a single node is shown within each cluster, it is to be appreciated the clusters may include multiple nodes.

The management planes may be responsible for managing configuration information, including policies (e.g., snapshot schedule policies, snapshot backup policies, and snapshot mirroring policies) and relationships (e.g., data protection relationships between source volumes and destination volumes, relationships between policies and volumes). The management planes may also be responsible for schedules. For example, management plane 710a may be responsible for triggering the creation of volume-level snapshots (e.g., snapshots 725a-n) in accordance with rules specified by a snapshot backup policy and management plane 710b may be responsible for causing snapshots to be transferred from a source volume (not shown) of the source node 720a to a destination volume (not shown) of the destination node 720b in accordance with rules specified by a snapshot mirroring policy.

Management plane 710a is shown including a source cluster UI (e.g., UI 711a) and a configuration module (e.g., configuration module 713a). UI 711a may be used by an administrative user to, among other things, create, modify, and/or delete snapshot schedule policies, associate and/or disassociate a given snapshot schedule policy with a source volume (not shown) of the source node 720a, manually tag or label snapshots with labels of desired snapshot schedule policies (e.g., hourly, daily, weekly, and monthly), and/or when locking is enabled for the source volume, manually assign a retention time to a given snapshot during or after its creation. The configuration module may maintain a replicated database that includes cluster configuration information.

Management plane 710b is shown including a destination cluster UI (e.g., UI 711b), a configuration module (e.g., configuration module 713b), and a scheduler service (e.g., scheduler 712). Snapshot mirroring functionality and configuration thereof may be destination managed. In one embodiment, cross-cluster concurrency control is provided by limiting performance of management functions associated with data protection relationships (e.g., mirroring relationships) between a given source volume and a given destination volume to the destination cluster hosting the given destination volume. For example, creation and/or modification of configuration information associated with a data protection relationship involving a destination volume hosted by the destination cluster 700b may be limited to being performed via configuration module 713b and UI 711b. In this manner, cross-cluster concurrency control is provided without the need for implementing a potentially complex distributed locking mechanism. For example, source cluster managed relationships would otherwise require such a mechanism to prevent multiple entities (remote) from modifying and/or updating a single destination. The destination management approach also eliminates the need for inter-cluster synchronization and instead allows the snapshot mirroring function to rely on the replicated configuration database for synchronization or relationships and configuration changes. As above, the configuration module may maintain a copy of the replicated database that includes cluster configuration information.

In addition to destination managed configuration, the transfer of snapshots from a given source volume to a given destination volume that are part of a given data protection relationship may also be triggered by the destination node. For example, the scheduler service may periodically direct the control plane 721b to coordinate transfer of snapshots created on a given source volume (e.g., created since the last mirroring cycle) of a given mirroring relationship to the given destination volume of the given mirroring relationship. In one embodiment, like snapshot creation, snapshot mirroring may be performed in a policy-based manner in which rules specified by a snapshot mirroring policy are periodically evaluated and carried out in accordance with a schedule implemented by the scheduling service. While in the context of various examples described herein, snapshot management is used to decouple the creation of snapshots on the source node 720a from the transfer of the snapshots (e.g., snapshot replicas 727a-n) to the destination node 720b, it is to be appreciated in other examples, the transfer of snapshots may be triggered responsive to snapshot creation.

In the context of the present example, the source node 720a and the destination node 720b are shown including respective control planes (e.g., control plane 721a and 721b), respective data planes (e.g., data planes 723a and 723b), respective file systems (e.g., file systems 722a and 722b), and respective tamper-proof timers (e.g., tamper-proof timer 724a and 724b). The control planes may be responsible for, among other things, providing concurrency control infrastructure at the volume level, snapshot creation, snapshot transfer negotiations, and communication with respective data planes. A recovery point manager (RPM) (not shown) may expedite the creation of source snapshots as soon as the schedule (e.g., one or more rules specified by a snapshot backup policy) calls for it. The control planes may expose the snapshot services provided on behalf of the management planes via application programming interfaces (APIs).

The data planes may be responsible for, among other things, providing storage efficient transfers of snapshots from a given source volume to a given destination volume as initiated by the control planes. Depending upon the particular implementation the data planes may utilize one or more replication engines for block replication and/or logical replication for volume endpoints. In one embodiment, both replication engines operate at the volume level, but have different characteristics. For example, a block replication engine (BRE) may replicate volumes using volume block (VVBN) reading and writing and may use knowledge of the file system to determine differences between snapshots at the block allocation level. In contrast, logical replication with storage efficiency (LRSE) may replicate data in volumes using inode-level (inodes and buftrees) reading and writing operations and uses knowledge of the file system to determine differences between snapshots at the indirect pointer level. LRSE may also uses block-level metadata to pass storage efficiency information from one side to the other.

The file systems (e.g., WAFL) may be responsible for, among other things, file system snapshot creation and deletion, providing an interface through which a tags/labels may be added to, deleted from a given snapshot as well as modified. The file systems may also provide volume and snapshot information to the control plane to facilitate snapshot transfer setup. Additionally the file systems may perform data recovery from a locked snapshot, handle read/write processing, and background scanning.

In the context of the present example, the file systems (e.g., WAFL) include, among other things, a background scanner 730 and a volume clone module 740. Assuming the volume to be recovered (a data protection volume) is within a unified aggregate, a non-SnapLock clone volume (a non-data-protection clone volume) may be created from a parent volume of type data protection volume (representing a data protection volume) within the aggregate. In various examples described herein, as part of performing a data recovery from a locked snapshot, containing a point-in-time image of the data protection volume, a new recovery volume (having a type of non-data protection volume) is created within the aggregate in the form of a volume clone of the data protection volume using the volume clone module 740. A non-limiting example of data recovery from a locked snapshot is described further below with reference to FIG. 8.

After the new recovery volume has been created within the aggregate, the background scanner 730 may be launched to clear the WORM flags or lock metafiles that were previously used to protect the content of the dataset from being changed when stored on the data protection volume. A non-limiting example of background scanner processing is described further below with reference to FIG. 9.

The tamper-proof timers may each represent a secure clocking mechanism (e.g., a secure time base). The time/date of a given tamper-proof timer (which cannot be reset after initialization) may be used as a current time from which a retention time may be calculated for a given snapshot based on the retention period associated with the snapshot. The tamper-proof timers may be initialized with a time value upon creation, stored in memory, updated independently of the system time, and used to determine whether a locked snapshot can be deleted or is to be retained. Traditional system clocks are not used for data protection (e.g., ransomware protection, legal holds, and/or for regulatory compliance), such as retention of locked snapshots for a specified retention period, as system clocks may be modified thereby allowing the retention period to be subverted. For example, using a system clock alone, a locked snapshot desired to be retained for one month may easily be deleted by changing the system clock to a time past the one month date and subsequently deleting the snapshot.

Snapshots (e.g., snapshots 725a-n and snapshot replicas 727a-n) may each have a snapshot instance identifier (ID) or simply a snapshot ID that is unique (at least within the volume on which it is stored). The snapshot ID may be used to associate a given snapshot (e.g., snapshot 725a) with its corresponding lock metafile (e.g., lock metafile 726a). Snapshots may also include tags or labels. The tags or labels may include user tags/labels that are administrator-entered information used for informational only purposes or system-set information used for informational purposes by administrative users. In either case, the tags/labels may additionally be used by snapshot management functionality to determine which snapshots to replicate and how long to retain them.

Snapshots may include volume-level or file system level snapshots created automatically as a result of evaluation of a rule of a snapshot schedule policy or created responsive to a command received from an administrative user. Snapshots may also include those requested to be created by an application. For example, for a volume that is part of an Oracle database, the Oracle database may request an application-consistent snapshot be taken on a daily basis or in accordance with another schedule.

Snapshots may be locked or unlocked. Locked snapshots are snapshots having an associated non-zero retention period and stored on a volume for which snapshot locking is enabled (which may also be referred to as snapshot retention being enabled). In various embodiments described herein, locked snapshots have corresponding lock metafiles (e.g., lock metafiles 726a-n and lock metafiles 728a-n) stored in a private inode space so as to preclude their deletion until the current time is greater than or equal to the immutable retention time contained within the corresponding lock metafile. Unlocked snapshots are snapshots having a non-zero retention period and stored on a volume for which locking is not enabled or having a retention period of zero.

In one embodiment, multiple use cases are supported for retention of snapshots, including (i) maintaining locked snapshots on a source volume on which they were originally created for at least the associated retention period; (ii) maintaining locked snapshots on the source volume, replicating the locked snapshots to a destination volume, and also maintaining the replicas of the locked snapshots (e.g., snapshot replicas 727a-n) on the destination volume for at least the associated retention period; and (iii) maintaining unlocked snapshots, replicating the unlocked snapshots to a destination volume, locking the replicated snapshots on the destination volume when the associated retention period is non-zero, and thereafter maintaining the replicas of the locked snapshots on the destination volume for at least the associated retention period.

While in the context of the present example, snapshots and snapshot replicas are shown having corresponding lock metafiles, it is to be appreciated other types of files (e.g., files associated with word-processing applications (e.g., .docx files), image files, text files, portable document format (PDF) files, multimedia files, and others) may also be retained for an associated file-level retention period by creating corresponding lock metafiles.

Example Data Recovery from a Locked Snapshot

Figure 8:
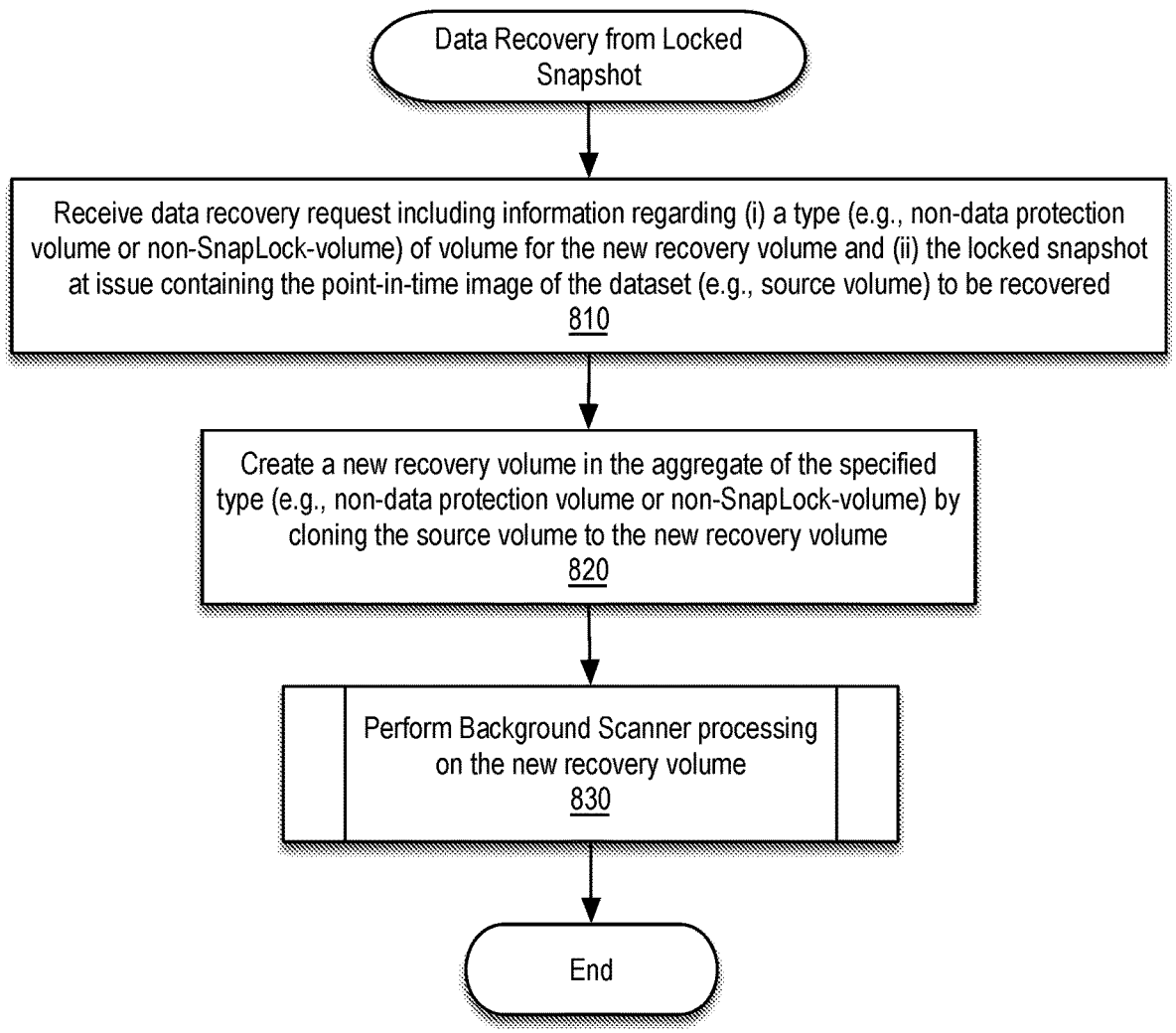
FIG. 8 is a flow diagram illustrating operations for performing data recovery from a locked snapshot in accordance with an embodiment of the present disclosure.

FIG. 8 is a flow diagram illustrating operations for performing data recovery from a locked snapshot (e.g., one of snapshots 725a-n or snapshot replicas 727a-n) in accordance with an embodiment of the present disclosure. The processing described with reference to FIG. 8 may be performed by a file system (e.g., file system 722a or file system 722b) of a distributed storage system (e.g., source cluster 700a or destination cluster 700b).

At block 810, a data recovery request may be received. The data recovery request may include information regarding (i) a type of volume for the new recovery volume and (ii) the locked snapshot at issue. According to one embodiment, a first parameter of the data recovery request may specify the type of volume as one of a non-data protection volume or a data-protection volume. Assuming, it is desirable to have the recovered data be available for both read and write access, the first parameter will specify the type of volume for the new recovery volume as a non-data protection volume. Another parameter of the data recovery request may be a file name or other file identifier of the parent snapshot—the locked snapshot that contains a point-in-time image of the dataset (e.g., a source data-protection volume) that is to be recovered to the new recovery volume.

At block 820, a new recovery volume of the specified type is created within an aggregate (e.g., aggregate 400) utilized by the distributed storage system. For example, the new recovery volume may be created as a non-data protection volume within the aggregate. According to one embodiment, rather than making an actual copy of the underlying data within the dataset, the source volume is cloned to create the new recovery volume, for example, by volume cloning functionality (e.g., volume clone module 740). In one embodiment, the parameters provided by the data recovery request may be passed along as parameters to the volume cloning functionality. A non-limiting example of a volume clone is a FlexClone volume by NetApp, Inc. The resulting volume clone created by the volume clone functionality may represent a writable, space-efficient, point-in-time copy of the parent volume (e.g., a source data-protection volume). Generally, a volume clone can be performed instantly as a volume clone simply refers to the common data of the parent volume by reference. Other potential parameters to the volume clone functionality may include information indicative of the junction path (e.g., junction 180a, junction 180b, or junction 180c) where the volume clone is to be mounted.

At block 830, background scanner processing is performed on the new recovery volume. The background scanner processing may be performed by a background scanner module (e.g., background scanner 730), for example, to clear WORM flags or lock metafiles that were previously used to protect the content from being changed while stored on the data-protection volume. In this manner, the new recovery volume (the volume clone) may be used in read-write mode. A non-limiting example of the background scanner processing is described further below with reference to FIG. 10.

Example Read/Write Processing from/to a Recovery Volume

Figure 9:
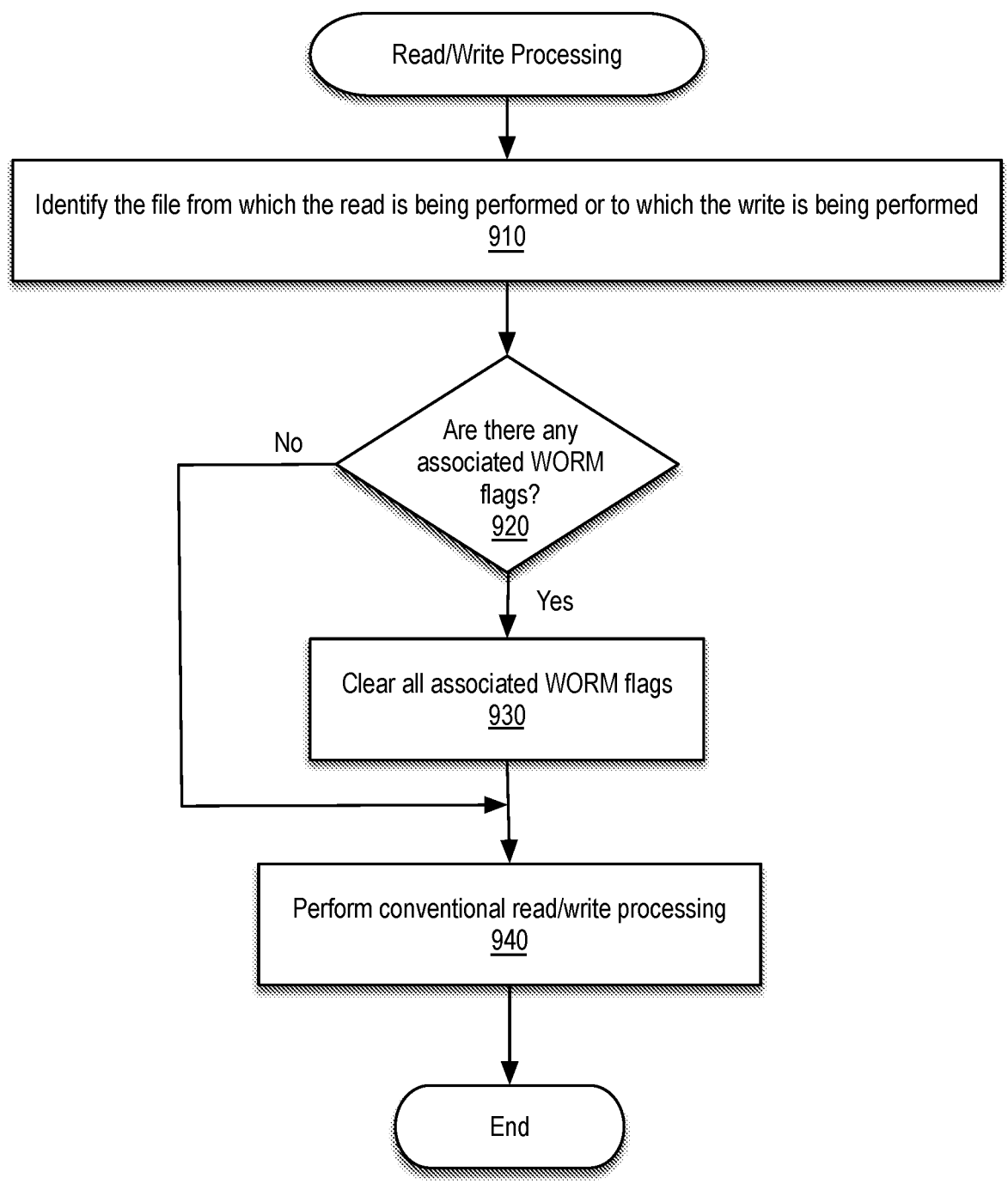
FIG. 9 is a flow diagram illustrating operations for performing read/write processing from/to a recovery volume in accordance with an embodiment of the present disclosure.

FIG. 9 is a flow diagram illustrating operations for performing read/write processing from/to a recovery volume in accordance with an embodiment of the present disclosure. The processing described with reference to FIG. 9 may be performed by a file system (e.g., file system 722a or file system 722b) of a distributed storage system (e.g., source cluster 700a or destination cluster 700b). In the context of the present example, it is assumed a read or write operation has been requested by a client to be performed from/to a particular file stored on the recovery volume and the recovery volume is a non-data protection volume created by cloning a data-protection volume, for example, based on a locked snapshot representing a point-in-time image of the data-protection volume. In order for the recovery volume to be used effectively in read-write mode, the data protection information (e.g., WORM flags and/or lock metafiles) that previously served the purpose of enforcing particular limitations relating to overwriting, modification, and/or deletion of locked files while stored on the data-protection volume should be ignored and cleared (or removed) when performing reads/writes to such files on a recovery volume that represents is a non-data protection volume (i.e., one that does not operate in WORM mode).

At block 910, the identity of a file from which or to which a read or write operation has been requested is determined. For example, the file may be identified based on a file handle provided by the client as part of the read or write operation, which corresponds to the inode associated with the file (e.g., file 631a).

At decision block 920, it is determined whether there are any WORM flags (e.g., WORM flag(s) 632a) associated with the file. If so, processing continues with block 930; otherwise processing branches to block 940.

At block 930, all WORM flags associated with the file are cleared (e.g., set to Boolean false or 0) to disable any prior limitations relating to overwriting, modification, and/or deletion of the file while it was stored as a locked file on the data protection volume.

At block 940, conventional read/write processing is performed.

While in the context of the present example, the data protection information associated with a file is assumed to be in the form of one or more WORM flags, it is to be appreciated the methodologies described herein are equally applicable to scenarios in which the data protection information associated with a file is in the form of a lock metafile. For example, in such a case, rather than performing on-access clearing of any WORM flags associated with the file, the associated lock metafile would be removed or deleted on access.

Example Background Scanner Processing

Figure 10:
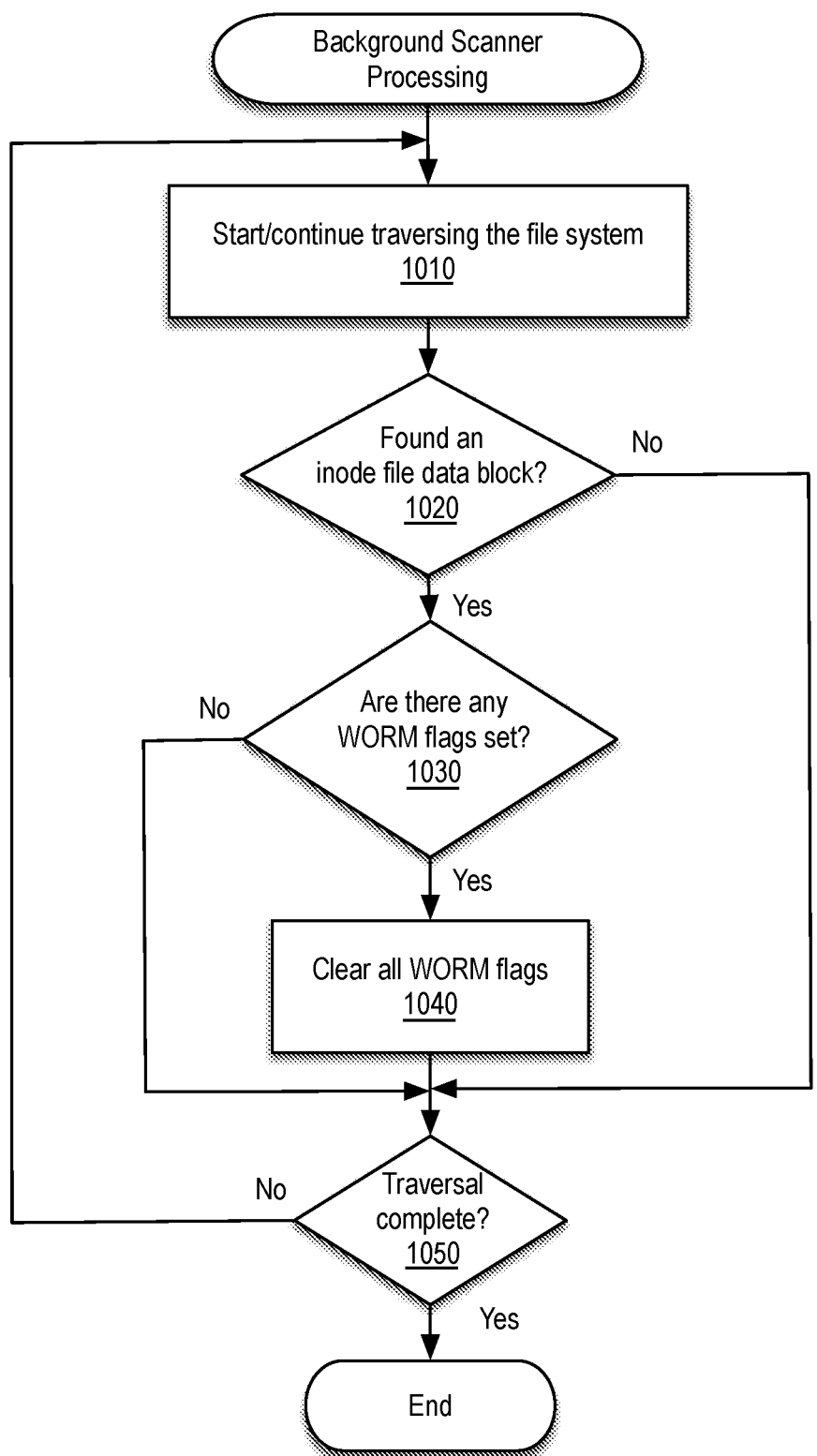
FIG. 10 is a flow diagram illustrating operations for performing background scanner processing in accordance with an embodiment of the present disclosure.

FIG. 10 is a flow diagram illustrating operations for performing background scanner processing in accordance with an embodiment of the present disclosure. The processing described with reference to FIG. 10 represent a non-limiting example of operations that may be performed by block 830 of FIG. 8 and may be performed by a background scanning module (e.g., background scanner 730) associated with a file system (e.g., file system 722a) of a distributed storage system (e.g., source cluster 700a). The processing In the context of the present example, it is assumed data recovery has previously been performed, for example, in accordance with FIG. 8 form a locked snapshot (containing a point-in-time image of a source data-protection volume) to a new recovery volume having a volume type of non-data protection.

At block 1010, a traversal of the file system is started. Assuming a file system representation as depicted in FIG. 6, the traversal may start at the root inode 610, for example, in the form of a depth first or breadth first search for appropriate inodes (e.g., an inode file data block that contains or references an L1 block or an L0 block of a file). In one embodiment, the background scanner processing is performed in the background so as to avoid impacting (e.g., interfering with or slowing down the performance of) other more critical processing of the storage system.

At decision block 1020, it is determined whether an inode file data block has been encountered during the file system traversal. If so, processing continues with decision block 1030; otherwise, processing branches to decision block 1050.

At decision block 1030, it is determined whether the inode file data block includes any WORM flags that are set. If so, processing continues with block 1040; otherwise, processing branches to decision block 1050.

At block 1040, all WORM flags are cleared (e.g., set to Boolean false or 0) to disable any prior limitations relating to overwriting, modification, and/or deletion of the file while it was stored as a locked file on the data protection volume.

At decision block 1050, it is determined if the file system traversal is complete. If so, the background scanner processing is complete; otherwise, processing loops back to block 1010 to continue the traversal.

While in the context of the present example, the data protection information associated with a file is assumed to be in the form of one or more WORM flags, it is to be appreciated the methodologies described herein are equally applicable to scenarios in which the data protection information associated with a file is in the form of a lock metafile. For example, in such a case, rather than clearing WORM flags within an inode file data block associated with the file, the associated lock metafile would be removed or deleted. Another option would be to scan through the private inode space in which the lock metafiles are stored and remove them as they are encountered.

While in the context of the flow diagrams of FIGS. 8-10, a number of enumerated blocks are included, it is to be understood that other examples may include additional blocks before, after, and/or in between the enumerated blocks. Similarly, in some examples, one or more of the enumerated blocks may be omitted and/or performed in a different order.

Embodiments of the present disclosure include various steps, which have been described above. The steps may be performed by hardware components or may be embodied in machine-executable instructions, which may be used to cause one or more processing resources (e.g., one or more general-purpose or special-purpose processors) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors (e.g., processors 222*a-b*) within a single computer) and storage systems containing or having network access to computer program(s) coded in accordance with various methods described herein, and the method steps associated with embodiments of the present disclosure may be accomplished by modules, routines, subroutines, or subparts of a computer program product.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device (e.g., local storage 230). Volatile media includes dynamic memory, such as main memory (e.g., memory 224). Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (e.g., system bus 223). Transmission media can also take the form of acoustic or light waves, such as those generated during radio-wave and infra-red data communications.

Various forms of media may be involved in carrying one or more sequences of one or more instructions to the one or more processors for execution. For example, the instructions may initially be carried on a magnetic disk or solid state drive of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on bus. Bus carries the data to main memory (e.g., memory 224), from which the one or more processors retrieve and execute the instructions. The instructions received by main memory may optionally be stored on storage device either before or after execution by the one or more processors.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A method comprising:
receiving a request, by a storage system, to recover data from a locked snapshot, containing a point-in-time image of a data protection volume, to a recovery volume, wherein the data protection volume includes one or more locked files;

creating the recovery volume without making a copy of the one or more locked files by cloning the data protection volume; and facilitating usage of the recovery volume in read-write mode by causing a background scanner to clear or remove data protection information associated with respective locked files of the one or more locked files.

2. The method of claim 1, further comprising clearing or removing the data protection information associated with a particular locked file of the one or more locked files in connection with processing of a request by a client to read from or write to the particular locked file.

3. The method of claim 1, wherein the data protection information associated with a particular locked file of the one or more locked files comprises one or more write only, read many (WORM) flags.

4. The method of claim 3, wherein the one or more WORM flags are contained within an index node (inode) associated with the particular locked file.

5. The method of claim 1, wherein the data protection information wherein the data protection information associated with a particular locked file of the one or more locked files comprises a lock metafile.

6. The method of claim 1, wherein the recovery volume comprises a non-data-protection volume.

7. A non-transitory machine readable medium storing instructions, which when executed by one or more processing resources of a storage system, cause the storage system to:

receive a request to recover data from a locked snapshot, containing a point-in-time image of a data protection volume, to a recovery volume, wherein the data protection volume includes one or more locked files;

create the recovery volume without making a copy of the one or more locked files by cloning the data protection volume; and facilitate usage of the recovery volume in read-write mode by causing data protection information associated with respective locked files of the one or more locked files to be cleared or removed as part of a background process.

8. The non-transitory machine readable medium of claim 7, wherein the instructions further cause the storage system to clear or remove the data protection information associated with a particular locked file of the one or more locked files in connection with processing of a request by a client to read from or write to the particular locked file.

9. The non-transitory machine readable medium of claim 7, wherein the data protection information associated with a particular locked file of the one or more locked files comprises one or more write only, read many (WORM) flags.

10. The non-transitory machine readable medium of claim 9, wherein the one or more WORM flags are contained within an index node (inode) associated with the particular locked file.

11. The non-transitory machine readable medium of claim 7, wherein the data protection information associated with a particular locked file of the one or more locked files comprises a lock metafile.

12. The non-transitory machine readable medium of claim 7, wherein the recovery volume comprises a non-data-protection volume.

13. The non-transitory machine readable medium of claim 12, wherein the data protection volume and the recovery volume are contained within a same aggregate.

14. A storage system comprising:

one or more processing resources; and instructions that when executed by the one or more processing resources cause the storage system to:

receive a request to recover data from a locked snapshot, containing a point-in-time image of a data protection volume, to a recovery volume, wherein the data protection volume includes one or more locked files;

create the recovery volume without making a copy of the one or more locked files by cloning the data protection volume; and facilitate usage of the recovery volume in read-write mode by causing data protection information associated with respective locked files of the one or more locked files to be cleared or removed as part of a background process.

15. The storage system of claim 14, wherein the instructions further cause the storage system to clear or remove the data protection information associated with a particular locked file of the one or more locked files in connection with processing of a request by a client to read from or write to the particular locked file.

16. The storage system of claim 14, wherein the data protection information associated with a particular locked file of the one or more locked files comprises one or more write only, read many (WORM) flags.

17. The storage system of claim 16, wherein the one or more WORM flags are contained within an index node (inode) associated with the particular locked file.

18. The storage system of claim 14, wherein the data protection information associated with a particular locked file of the one or more locked files comprises a lock metafile.

19. The storage system of claim 14, wherein the recovery volume comprises a non-data-protection volume.

20. The storage system of claim 19, wherein the data protection volume and the recovery volume are contained within a same aggregate.

* * * * *